US006868157B1

(12) United States Patent
Okuda

(10) Patent No.: US 6,868,157 B1
(45) Date of Patent: Mar. 15, 2005

(54) ECHO CANCELING METHOD, ECHO CANCELLER AND VOICE SWITCH

(75) Inventor: Kozo Okuda, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/508,579

(22) PCT Filed: Sep. 10, 1998

(86) PCT No.: PCT/JP98/04107
§ 371 (c)(1),
(2), (4) Date: Mar. 14, 2000

(87) PCT Pub. No.: WO99/14868
PCT Pub. Date: Mar. 25, 1999

(30) Foreign Application Priority Data

Sep. 16, 1997 (JP) .............................. 9-250465
Mar. 31, 1998 (JP) ........................... 10-105696

(51) Int. Cl.$^7$ .............................................. H04M 9/08
(52) U.S. Cl. ........................ 379/406.01; 379/406.06; 379/406.08; 379/406.09; 379/406.05
(58) Field of Search ................................ 379/388–390, 379/406.01–406.16

(56) References Cited

U.S. PATENT DOCUMENTS

| 4,029,912 | A |   | 6/1977  | Geigel et al.     |         |
|-----------|---|---|---------|-------------------|---------|
| 5,305,307 | A | * | 4/1994  | Chu               | 379/406 |
| 5,307,405 | A |   | 4/1994  | Sih               |         |
| 5,544,242 | A |   | 8/1996  | Robinson          |         |
| 5,553,014 | A | * | 9/1996  | De Leon, II et al.| 379/406 |
| 5,559,881 | A |   | 9/1996  | Sih               |         |
| 5,646,991 | A |   | 7/1997  | Sih               |         |
| 5,649,012 | A | * | 7/1997  | Gupta et al.      | 379/410 |
| 5,687,229 | A |   | 11/1997 | Sih               |         |
| 5,774,561 | A | * | 6/1998  | Nakagawa et al.   |         |
| 5,912,966 | A | * | 6/1999  | Ho                | 379/410 |

FOREIGN PATENT DOCUMENTS

| DE | 43 17 043 | 11/1994 |
| EP | 0 376 582 | 7/1990  |
| EP | 0 732 838 | 9/1996  |
| JP | 62-071362 | 4/1987  |
| JP | 64-2424   | 1/1989  |
| JP | 1-157655  | 6/1989  |
| JP | 02-260857 | 10/1990 |
| JP | 2-309851  | 12/1990 |
| JP | 5-145378  | 6/1993  |
| JP | 6-78046   | 3/1994  |
| JP | 6-48832   | 6/1994  |
| JP | 8-321795  | 12/1996 |
| JP | 9-233002  | 9/1997  |

OTHER PUBLICATIONS

International Preliminary Examination Report issued in PCT/JP98/04107 on Nov. 26, 1999, English-language translation (4 pages mailed May 8, 2000).

"Short Tail Echo Canceller Using Whitening Filter", Inoue et al. Proceedings of the 5$^{th}$ Sony Research Forum (1995), pp. 323–326. (Partial Translation).

Rudi Frenzel et al., "Using Prewhitening and Stepsize Control to Improve the Performance of the LMS Algorithm for Acoustic Echo Compensation", pp. 1930–1932 (1992) IEEE.

Notice of Rejection with English translation dated Feb. 3, 2004.

* cited by examiner

Primary Examiner—Forester W Isen
Assistant Examiner—Ramnandan Singh
(74) Attorney, Agent, or Firm—Smith, Gambrell & Russell, LLP

(57) ABSTRACT

A digitized input signal is sampled, to obtain a reference input signal. The reference input signal is spuriously whitened, to obtain a pseudo whitened signal. An echo replica signal is generated on the basis of the pseudo whitened signal and an adaptive filter coefficient. A cancellation error signal is obtained on the basis of an echo signal and the echo replica signal. The adaptive filter coefficient is updated on the basis of the cancellation error signal, the adaptive filter coefficient, and the pseudo whitened signal.

4 Claims, 15 Drawing Sheets

VOICED SPEECH

FREQUENCY (Hz)

UNVOICED SPEECH

FREQUENCY (Hz)

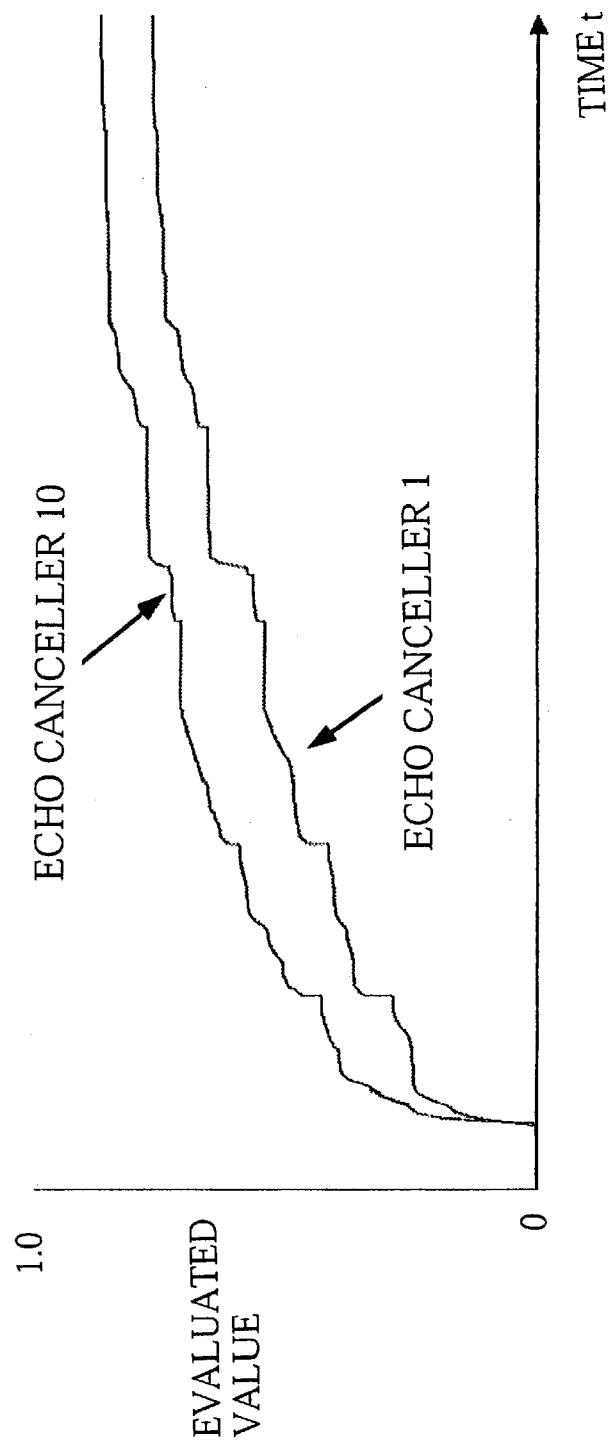
FIG. 11 a
FIG. 11 b

ECHO CANCELING METHOD, ECHO CANCELLER AND VOICE SWITCH

TECHNICAL FIELD

The present invention relates generally to an echo canceling method and an echo canceller, and more particularly, to an echo canceling method and an echo canceller which are utilized in order to realize full duplex in a hands-free telephone set or a television conference, for example.

Furthermore, the present invention relates to a voice switch used for a hands-free speech communication system capable of carrying out telephone conversation using a speaker and a microphone.

BACKGROUND ART

[1] In an echo canceller utilized in order to realize full duplex in a hands-free telephone set, a television conference, and so forth, an adaptive filter coefficient has been conventionally updated using an alternate voice, to estimate an impulse response of an echo path. As this estimation algorithm, the Normalized Least Mean Square Method (the NLMS Method) having a relatively small amount of operation has been frequently used.

FIG. 1 illustrates an example of a conventional echo canceller 1. The echo canceller 1 is constructed as a hybrid (line) echo canceller for canceling a hybrid echo, and updates an adaptive filter coefficient by the NLMS Method.

Referring to FIGS. 1 and 2, description is made of the operation of the echo canceller 1.

An echo signal y, an echo replica signal (a pseudo echo signal) Y, an adaptive filter coefficient, a value x in a reference input signal buffer, a cancellation error signal e, and so forth are initialized (step 1).

A microphone input signal which is digitized by an analog-to-digital (A/D) converter 2 is sampled, and is inputted to a reference input signal buffer 3 as a reference input signal X (step 3).

An adaptive filter coefficient Pj (i) in an adaptive filter 4 and the reference input signal X, i.e., a value xj (i) in the reference input signal buffer 3 at time j are multiplied and accumulated by a multiply and accumulate unit 5, thereby to generate an echo replica signal Yj at the time j, as expressed by the following equation (1) (step 5):

$$Yj = \sum_{i=1}^{N} Pj(i) \cdot xj(i) \quad (1)$$

A subtractor 7 subtracts the echo replica signal Yj from an echo signal yj outputted from an A/D converter 6, thereby to calculate a cancellation error signal ej at the time j, as expressed by the following equation (2), (step 7):

$$ej = yj - Yj \quad (2)$$

Thereafter, an adaptive filter coefficient Pj+1 (i) is updated by a coefficient updating unit 8 on the basis of the cancellation error signal ej the adaptive filter coefficient Pj (i), and the reference input signal X (=xj (i)) at the time j as expressed by the following equation (3) (step 9). That is, an adaptive filter coefficient at time (j+1) is found:

$$Pj+1(i) = Pj(i) + \frac{\mu ej \cdot xj(i)}{\sum_{i=1}^{N} xj(i)^2} \quad (3)$$

The processing at the foregoing steps 3 to 9 is repeated, so that the adaptive filter coefficient is updated.

In the above-mentioned equations (1) to (3), yj denotes an echo signal at the time j, Yj denotes an echo replica signal at the time j, Pj (i) denotes a coefficient of the i-th delay element in the adaptive filter at the time j, xj (i) denotes the i-th value of the reference input signal buffer at the time j ej denotes a cancellation error signal at the time j, N denotes the number of taps in the adaptive filter, and $\mu$ denotes a relaxation coefficient called a step gain. The same is true for embodiments of the invention, described later.

In the above-mentioned echo canceller 1, the adaptive filter coefficient is updated along the vector of the reference input signal X(=xj (i)), as expressed by the foregoing equation (3). However, the reference input signal is a voice signal which is high in auto-correlation, so that the learning speed is reduced. The vector of the reference input signal is a value, grasped as a vector, in the reference input signal buffer 3.

As indicated by the second term on the right side of the equation (3), $\mu ej \cdot xj(i)$ is normalized by the norm=$\Sigma xj(i)^2$ of the vector of the reference signal. Accordingly, the learning precision in a frequency area having a small number of frequency components is degraded by the deviation in frequency components of a voice signal.

When an impulse response of an echo path is estimated using an alternate voice, as in the echo canceller 1, therefore, frequency components of an input signal deviate. Even when learning is sufficiently performed, therefore, howling may, in some cases, occur.

The frequency characteristics of a voice signal are generally as shown in FIGS. 3a and 3b. That is, voiced speech (a voiced sound) has the property of decreasing in level by 6 dB when the frequency thereof increases by one octave (−6 dB/oct), as shown in FIG. 3a. Unvoiced speech (a voiceless sound) has the property of increasing in level by 6 dB when the frequency thereof increases by one octave (+6 dB/oct), as shown in FIG. 3b.

In order to improve the learning speed and the learning precision of an echo canceller using the NLMS Method, therefore, it is considered that the deviation in frequency characteristics of a signal used for learning is decreased.

Therefore, it is considered that a whitening filter 9 for decreasing the deviation in frequency characteristics of a voice signal is inserted between the A/D converter 2 and a digital-to-analog (D/A) converter 9, as in an echo canceller 1a shown in FIG. 4. In the echo canceller 1a, however, an output signal of the whitening filter 9 is outputted toward the hybrid side through the D/A converter 9, so that the sound quality of the output signal is degraded.

An object of the present invention is to provide echo canceling means and an echo canceller capable of improving the learning speed and the learning precision without degrading the sound quality of an output signal.

[2] In a voice switch used for a hands-free speech communication system, a signal in a communication path through which the voice of one of a near-end speaker and a far-end speaker who is talking by phone passes is passed, while a signal in a communication path through which the voice of the speaker who is talking by phone does not pass is attenuated by an attenuator, thereby preventing an echo from being returned to the communication path through which the voice of the speaker who is talking by phone does not pass.

In the voice switch, when one of the near-end speaker and the far-end speaker starts to talk by phone from a state where both the speakers do not talk by phone, the beginning or the ending, for example, of a word may, in some cases, be cut.

An object of the present invention is to provide a voice switch capable of preventing the beginning or the ending of a word from being cut, for example, when one of a near-end speaker and a far-end speaker starts to talk by phone from a state where both the speakers do not talk by phone as well as capable of carrying out more natural telephone conversation which hardly has a switching feeling.

DISCLOSURE OF INVENTION

An echo canceling method according to the present invention is an echo canceling method for updating an adaptive filter coefficient utilizing a digitized input signal to cancel an echo, characterized by comprising the steps of obtaining a reference input signal from the input signal; spuriously whitening the reference input signal, to obtain a pseudo whitened signal; generating an echo replica signal on the basis of the pseudo whitened signal and the adaptive filter coefficient; obtaining a cancellation error signal on the basis of an echo signal and the echo replica signal; and updating the adaptive filter coefficient on the basis of the cancellation error signal, the adaptive filter coefficient and the pseudo whitened signal.

An echo canceller according to the present invention is an echo canceller for updating an adaptive filter coefficient utilizing a digitized input signal to cancel an echo, comprising whitening means for spuriously whitening a reference input signal obtained from the input signal, to obtain a pseudo whitened signal; echo replica signal generation means for generating an echo replica signal on the basis of the pseudo whitened signal and the adaptive filter coefficient; cancellation error signal calculation means for obtaining a cancellation error signal on the basis of the echo signal and the echo replica signal; and coefficient updating means for updating the adaptive filter coefficient on the basis of the cancellation error signal, the adaptive filter coefficient and the pseudo whitened signal.

The whitening means is composed of an IIR filter or an FIR filter, for example.

In the echo canceling method and the echo canceller, the reference input signal obtained by sampling the digitized input signal is spuriously whitened by the whitening means composed of the IIR filter, the FIR filter, or the like, to obtain the pseudo whitened signal in which the deviation in frequency of the input signal is decreased. That is, the voice signal that is the reference input signal has the property of varying in level as the frequency thereof increases. In order to decrease the deviation in frequency of the reference input signal, therefore, a filter capable of reducing the variation in level corresponding to the increase in frequency of the reference input signal is used, to whiten the reference input signal by filtering.

The echo replica signal is generated on the basis of the pseudo whitened signal whose deviation in frequency is decreased and the adaptive filter coefficient, and the cancellation error signal is obtained on the basis of the echo signal and the echo replica signal. Specifically, the pseudo whitened signal and the adaptive filter coefficient are multiplied and accumulated, to generate the echo replica signal. The echo replica signal is subtracted from the echo signal, to obtain the cancellation error signal. Thereafter, the adaptive filter coefficient is updated on the basis of the cancellation error signal, the adaptive filter coefficient, and the pseudo whitened signal.

The pseudo whitened signal is obtained from the reference input signal obtained by sampling the input signal, and the input signal is fed to the D/A converter as it is. Accordingly, an output signal obtained by the D/A converter is outputted without degrading the sound quality thereof.

A first voice switch according to the present invention is characterized by comprising near-end speaker's voice judgment means for judging whether a near-end speaker's voice is present or absent; far-end speaker's voice judgment means for judging whether a far-end speaker's voice is present or absent; and speech communication state determination means for determining which of a near-end speaker speech communication state, a far-end speaker speech communication state, and an intermediate state is the current speech communication state on the basis of the results of the judgment by the near-end speaker's voice judgment means and the far-end speaker's voice judgment means, the preceding speech communication state determined, and the hysteresis of speech communication states preceding the preceding speech communication state.

A second voice switch according to the present invention is characterized by comprising near-end speaker's voice attenuation means for attenuating a near-end speaker's voice; far-end speaker's voice attenuation means for attenuating a far-end speaker's voice; near-end speaker's voice judgment means for judging whether the near-end speaker's voice is present or absent; far-end speaker's voice judgment means for judging whether the far-end speaker's voice is present or absent; speech communication state determination means for determining which of a near-end speaker speech communication state, a far-end speaker speech communication state and an intermediate state is the current speech communication state on the basis of the results of the judgment by the near-end speaker's voice judgment means and the far-end speaker's voice judgment means, the preceding speech communication state determined, and the hysteresis of speech communication states preceding the preceding speech communication state; means for controlling, when it is determined that the current speech communication state is the near-end speaker speech communication state, an attenuation amount by the near-end speaker's voice attenuation means at a low level, while controlling an attenuation amount by the far-end speaker's voice attenuation means at a high level; means for controlling, when it is determined that the current speech communication state is the far-end speaker speech communication state, an attenuation amount by the near-end speaker's voice attenuation means at a high level, while controlling an attenuation amount by the far-end speaker's voice attenuation means at a low level; and means for controlling, when it is determined that the current speech communication state is the intermediate state, both the attenuation amount by the near-end speaker's voice attenuation means and the attenuation amount by the far-end speaker's voice attenuation means at an intermediate level, the speech communication state determination means comprising means for determining, when the transition of the speech communication state between the near-end speaker speech communication state and the far-end speaker speech communication state occurs, the speech communication state such that the transition always occurs via the intermediate state.

It is preferable that the speech communication state determination means comprises, in a case where the transition from the near-end speaker speech communication state or the far-end speaker speech communication state to the intermediate state occurs, means for determining, when it is judged that the near-end speaker's voice or the far-end speaker's voice is present after the intermediate state is continued for not less than a predetermined time period, the speech communication state so as to proceed to a speaker speech communication state corresponding to the speaker's voice which is judged to be present, determining, when it is judged that the speaker's voice in a direction of speech communication before the transition to the intermediate state is present in a case where the time period during which the intermediate state is continued is shorter than the predetermined time period, the speech communication state so as to immediately return to a speaker speech communication state before the transition, and determining, even when it is judged that the speaker's voice in a direction of speech communication opposite to the direction of speech communication before the transition to the intermediate state is present in a case where a time period during which the intermediate state is continued is shorter than the predetermined time period, the speech communication state so as to maintain the intermediate state.

The number of types of the intermediate states is not limited to one. A plurality of types of intermediate states may be set.

According to the voice switch, in a case where one of a near-end speaker and a far-end speaker starts to talk by phone from a state where both the speakers do not talk by phone, it is possible to prevent the beginning or the ending of a word from being cut, for example, as well as to carry out more natural telephone conversation which hardly has a switching feeling.

BRIEF DESCRIPTION OF DRAWINGS

FIG. 11a is a graph showing the effect of a learning method in the echo canceller shown in FIG. 5 in comparison with the conventional NLMS Method, and FIG. 11b is a waveform diagram showing an input voice signal;

BEST MODE FOR CARRYING OUT THE INVENTION

[1] Description of First Embodiment

Referring now to FIGS. 5 to 12, a first embodiment of the present invention will be described.

Figure 5:
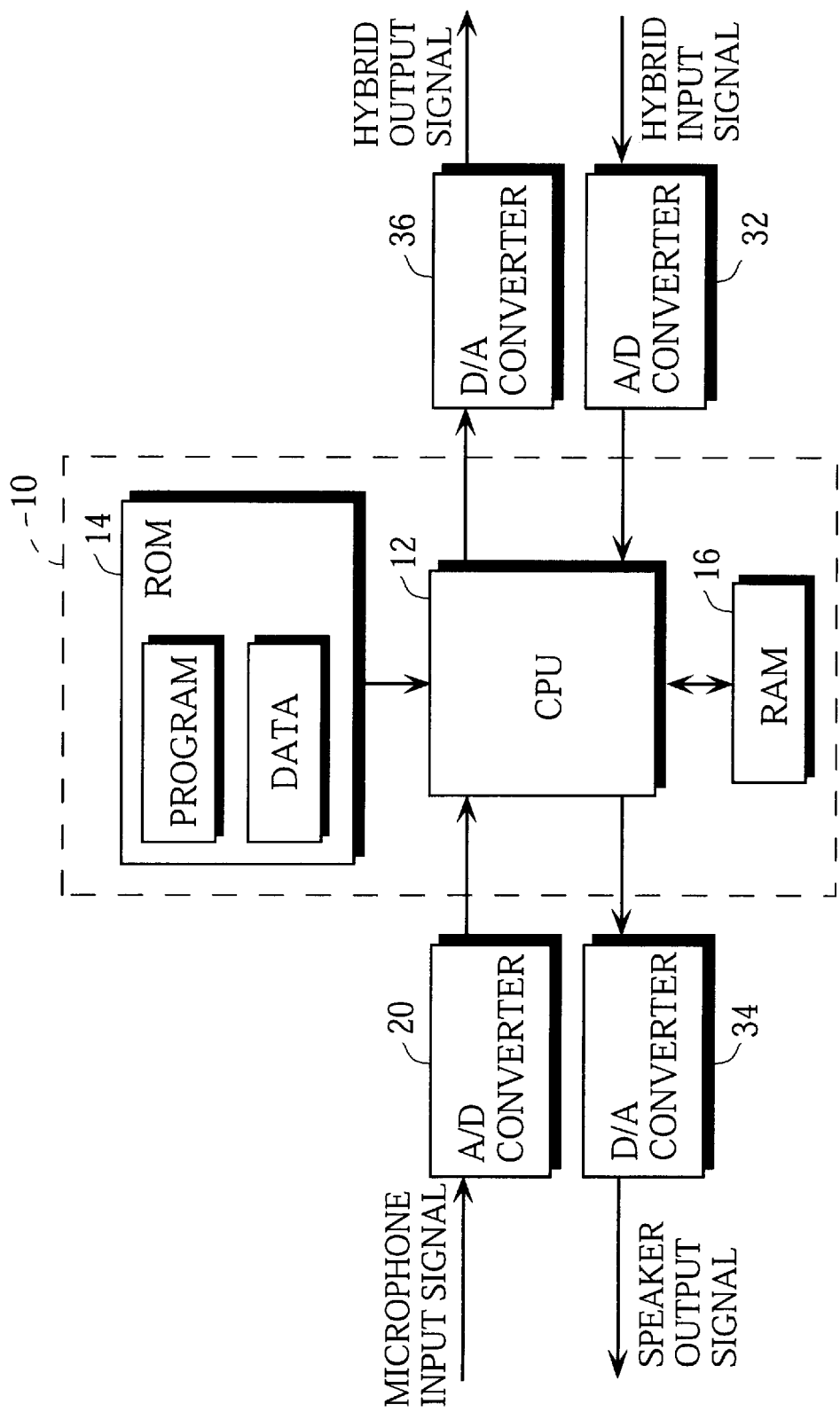
FIG. 5 is a block diagram showing the configuration of an echo canceller.

FIG. 5 illustrates an echo canceller 10 and its peripheral circuits.

The echo canceller 10 comprises a CPU 12, a ROM 14, and a RAM 16.

The ROM 14 stores a program for controlling the operation of the echo canceller 10, including the foregoing equations for calculation (1) to (3), and a previously set data. The data stored in the ROM 14 include the number of taps N in an adaptive filter 28 (described later), a step gain $\mu$, and so forth.

The RAM 16 temporarily stores data such as a calculated value obtained by an operation in the CPU 12. The data stored in the RAM 16 include an echo signal y, an echo replica signal Y, an adaptive filter coefficient, a value x in a reference input signal buffer, a cancellation error signal e, and so forth. The number of taps N in the adaptive filter and the step gain $\mu$ may be stored in the RAM 16.

The CPU 12 is operated using the program and the data which are stored in the ROM 14 and the RAM 16, to realize the echo canceller 10.

Figure 6:
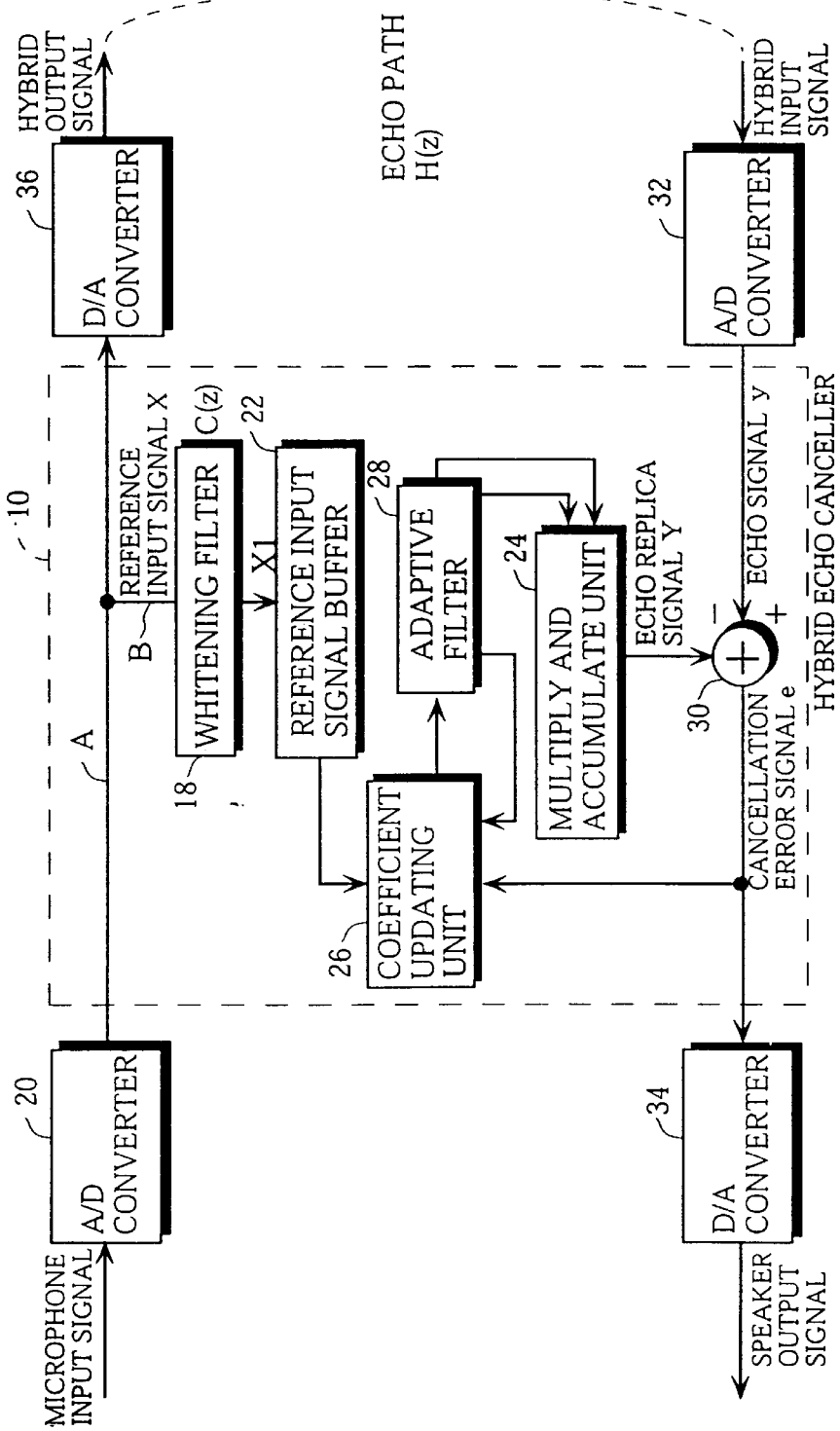
FIG. 6 is a functional block diagram showing the function of the echo canceller shown in FIG. 5.

FIG. 6 is a functional block diagram showing the function of the echo canceller 10 shown in FIG. 5

The echo canceller 10 shown in FIG. 6 is an example constructed as a hybrid echo canceller for canceling a hybrid echo. The echo canceller 10 comprises a whitening filter 18 for emphasizing a high frequency region. The whitening filter 18 is composed of an IIR (Infinite Impulse Response) filter, for example.

A signal obtained by digitizing a microphone input signal using an A/D converter 20 is sampled, and is inputted as a reference input signal X to the whitening filter 18. A pseudo whitened signal X1 is outputted from the whitening filter 18. The pseudo whitened signal X1 is temporarily stored in a reference input signal buffer 22.

The pseudo whitened signal X1 stored in the reference input signal buffer 22 is fed to a multiply and accumulate unit 24 and a coefficient updating unit 26 at predetermined timing. In the multiply and accumulate unit 24, an echo replica signal Y is calculated on the basis of the pseudo whitened signal X1 and an adaptive filter coefficient in an adaptive filter 28.

A subtractor 30 subtracts the echo replica signal Y from an echo signal y from an A/D converter 32, to obtain a cancellation error signal e. The cancellation error signal e is converted into an analog signal by a D/A converter 34, and the analog signal is then outputted as a speaker output signal. In a coefficient updating unit 26, the adaptive filter coefficient is updated such that it approaches an impulse response H(z) of an echo path on the basis of the pseudo whitened signal X1, the adaptive filter coefficient, and the cancellation error signal e.

The echo canceller 10 is characterized in the place where the whitening filter 18 is inserted. The whitening filter 18 is inserted into not a path A from the A/D converter 20 to a D/A converter 36 but a path B branched from the path A.

Consequently, the digitized microphone input signal from the A/D converter 20 is fed as it is to the D/A converter 36, so that the sound quality of a hybrid output signal outputted from the D/A converter 36 is not degraded.

Figure 7:
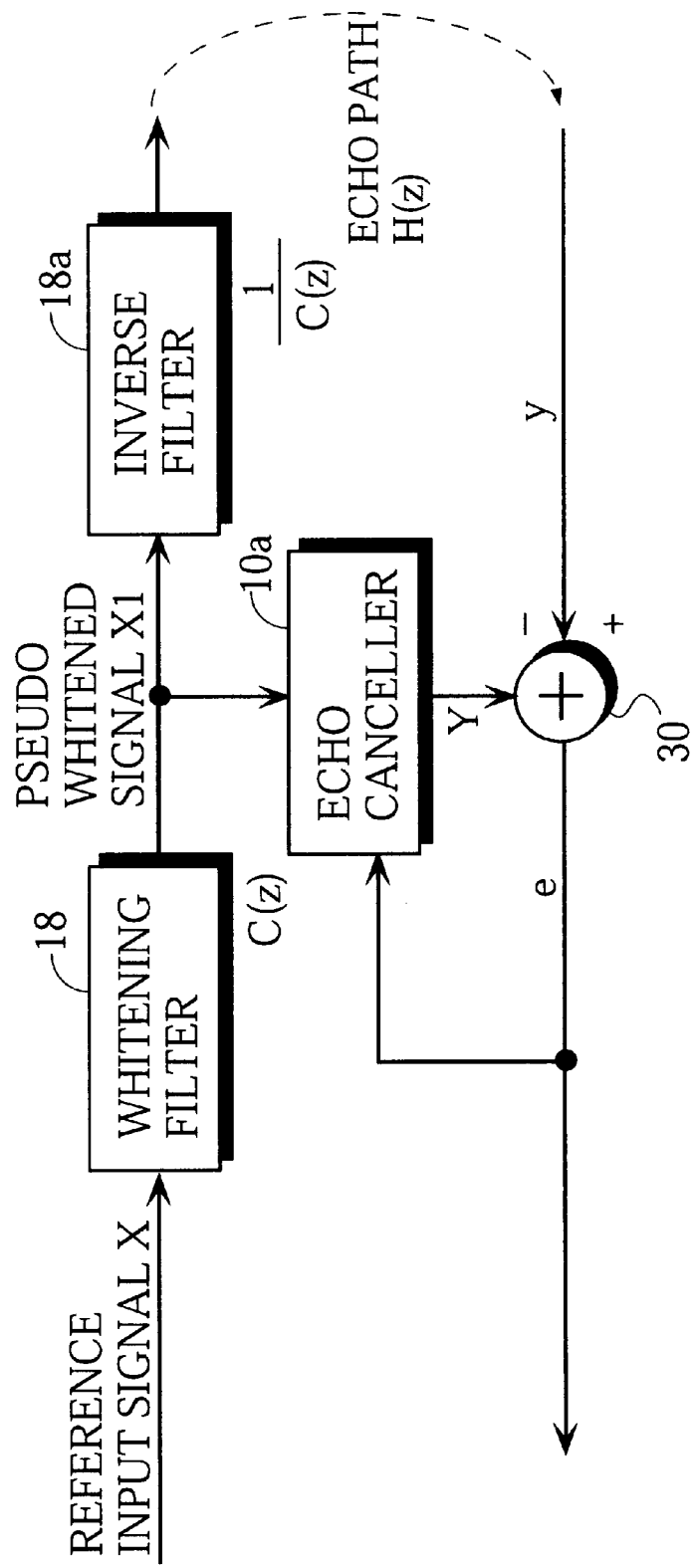
FIG. 7 is a diagram showing an equivalent circuit of a principal part of FIG. 6.

FIG. 7 illustrates an equivalent circuit of a principal part of the echo canceller 10 shown in FIG. 6. As can be seen from FIG. 7, the impulse response of the echo path as viewed from an echo canceller 10a is changed into H(z)·1/C(z) by inserting the whitening filter 18. That is, a hybrid output signal outputted from an inverse filter 18a becomes a value equal to the reference input signal X. Accordingly, the echo canceller 10a can estimate the impulse response H(z) of the echo path in a case where the same signal as the reference input signal X is outputted as the hybrid output signal on the basis of the pseudo whitened signal X1. Consequently, there arises no problem in an operation of estimating the impulse response H(z) of the echo path.

Figure 8:
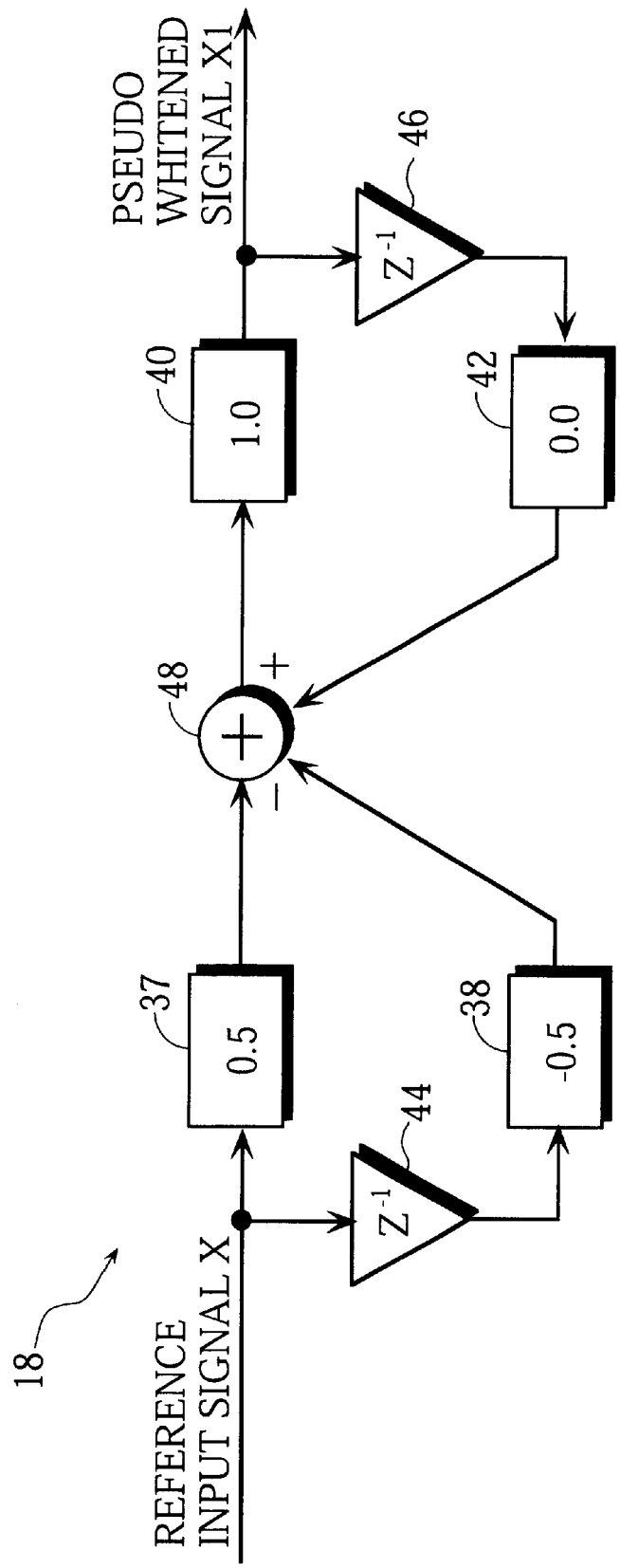
FIG. 8 is a block diagram showing a specific example of a whitening filter.

A 1st order IIR-type high-pass filter as shown in FIG. 8, for example, is used as the whitening filter 18. The 1st order IIR-type high-pass filter is a high-pass emphasizing filter whose cut-off frequency corresponding to a sampling signal having a frequency of 8 KHz is set to 2 KHz, to increase a voice signal in level by 3 dB as the frequency thereof increases by one octave. Voiced speech in the voice signal has the property of decreasing in level by approximately 6 dB every time the frequency thereof statistically increases by one octave. By using the 1st order IIR type high-pass filter, however, the attenuation characteristics of the voice signal are reduced, thereby obtaining a pseudo whitened signal X1 in which the deviation in frequency of the voice signal is decreased.

Figure 9:
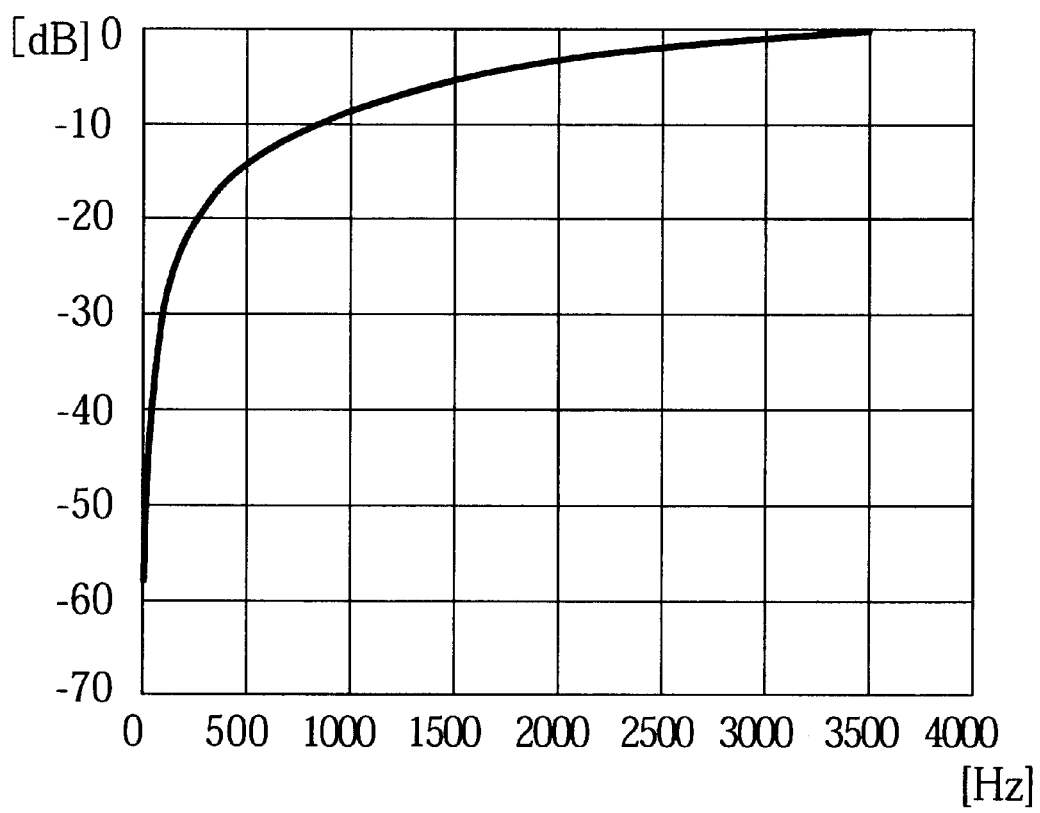
FIG. 9 is a graph showing the frequency characteristics of the whitening filter shown in FIG. 8.

The whitening filter 18 has multipliers 37, 38, 40, and 42 respectively having coefficients of 0.5, −0.5, 1.0, and 0.0, for example, delay circuits 44 and 46 for delaying an input signal by one sample, and an adder 48. The frequency characteristics of the whitening filter 18 are as shown in FIG. 9. As can be seen from the coefficient of the whitening filter 18, the whitening filter 18 performs the function of canceling 1st order auto-correlation.

When the whitening filter 18 is used, there are few frequency components which are less than approximately 300 Hz. Accordingly, learning in a region having few frequency components may be degraded. When the echo canceller 10 is employed for a telephone system, for example, however, the frequency band is limited such that its normal frequency band becomes 300 Hz to 3200 Hz, which does not particularly cause a problem.

In the echo canceller 10, the adaptive filter coefficient is updated by the NLMS Method using the pseudo whitened signal X1 which has been spuriously whitened by the whitening filter 18.

Figure 10:
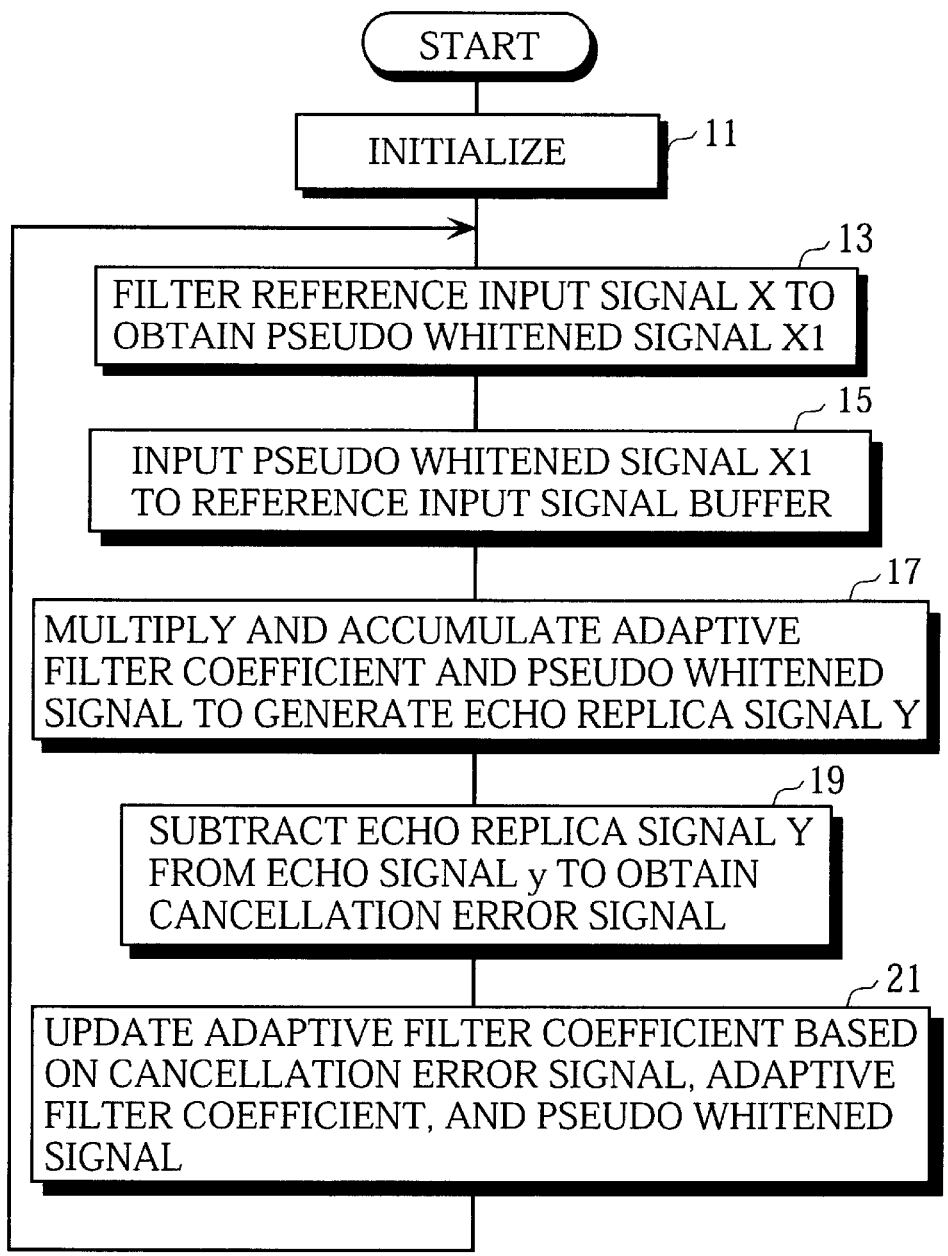
FIG. 10 is a flow chart showing the operation of the echo canceller shown in FIG. 5.
Figure 12:
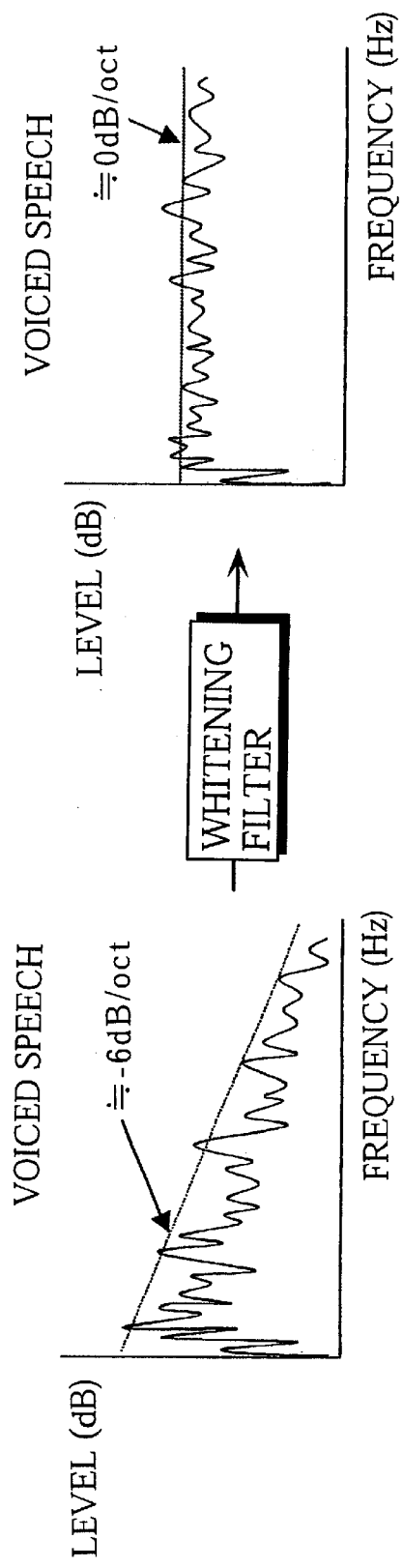
FIGS. 12a and 12b are graphs showing the characteristics of a whitening filter.
Figure 12:
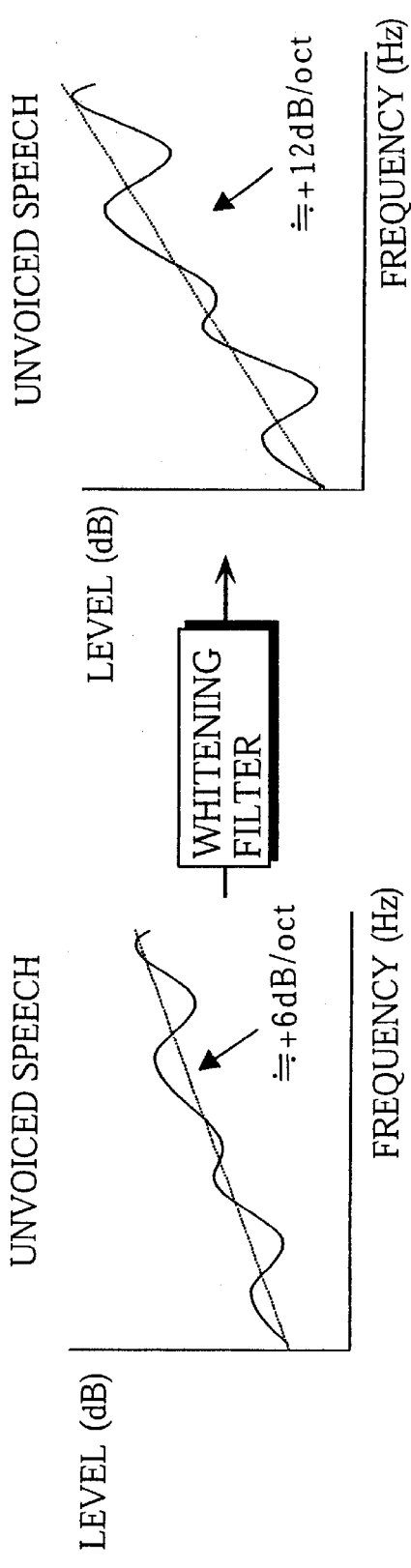

Referring to FIG. 10, the operation of the echo canceller 10 will be described.

First, an echo signal y, an echo replica signal Y, an adaptive filter coefficient, a value x in the reference input signal buffer 22, a cancellation error signal e, and so forth which are stored in the RAM 10 are first initialized (step 11).

A microphone input signal which has been digitized by the A/D converter 20 is sampled, and is inputted to the whitening filter 18 as a reference input signal X. The reference input signal X is filtered by the whitening filter 18, to obtain a pseudo whitened signal X1 (step 13). The obtained pseudo whitened signal X1 is inputted to the reference input signal buffer 22 (step 15).

As expressed by the foregoing equation (1), an adaptive filter coefficient Pj(i) in the adaptive filter 28 and the pseudo whitened signal X1, i.e., a value xj(i) in the reference input signal buffer 22 at time j are multiplied and accumulated by the multiply and accumulate unit 24, to generate an echo replica signal Yj at the time j.

As expressed by the foregoing equation (2), the subtractor 30 subtracts the echo replica signal Yj from an echo signal yj outputted from the A/D converter 32, to calculate a cancellation error signal ej at the time j (step 19).

Thereafter, as expressed by the foregoing equation (3), an adaptive filter coefficient Pj+1(j) is updated on the basis of the cancellation error signal ej, the adaptive filter coefficient Pj(i), and the pseudo whitened signal X1 (=Xj (i)) at the time j by the coefficient updating unit 26. That is, an adaptive filter coefficient at time (j+1) is found.

The processing at the foregoing steps 11 to 21 is repeated, thereby updating the adaptive filter coefficient.

According to the echo canceller 10, learning can be performed using the pseudo whitened signal X1 which hardly deviates in frequency, that is, is low in auto-correlation, thereby making it possible to improve the learning speed and the learning precision.

Not an output of the whitening filter 18 but an output of the A/D converter 20 (a digital signal corresponding to the microphone input signal) is fed as it is to the D/A converter 36 for generating a hybrid output signal, so that the sound quality of the hybrid output signal is not degraded.

The echo canceller 10 is constructed by only adding the whitening filter 18 for spurious whitening to the conventional echo canceller 1. Accordingly, an echo canceller, whose capability is improved, can be realized in approximately the same amount of processing as that by the conventional echo canceller 1.

Figure 1:
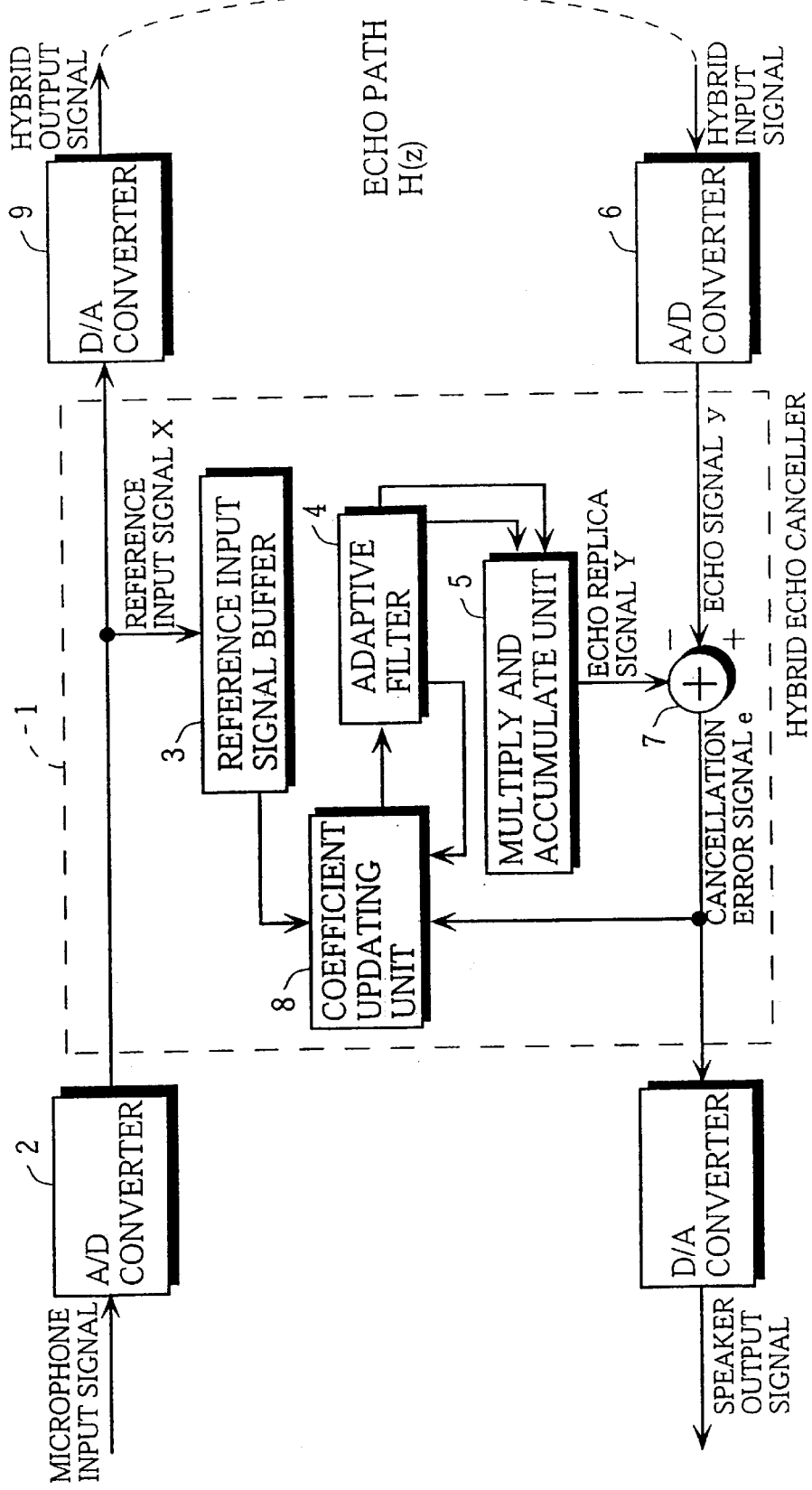
FIG. 1 is a block diagram showing a conventional echo canceller.
Figure 2:
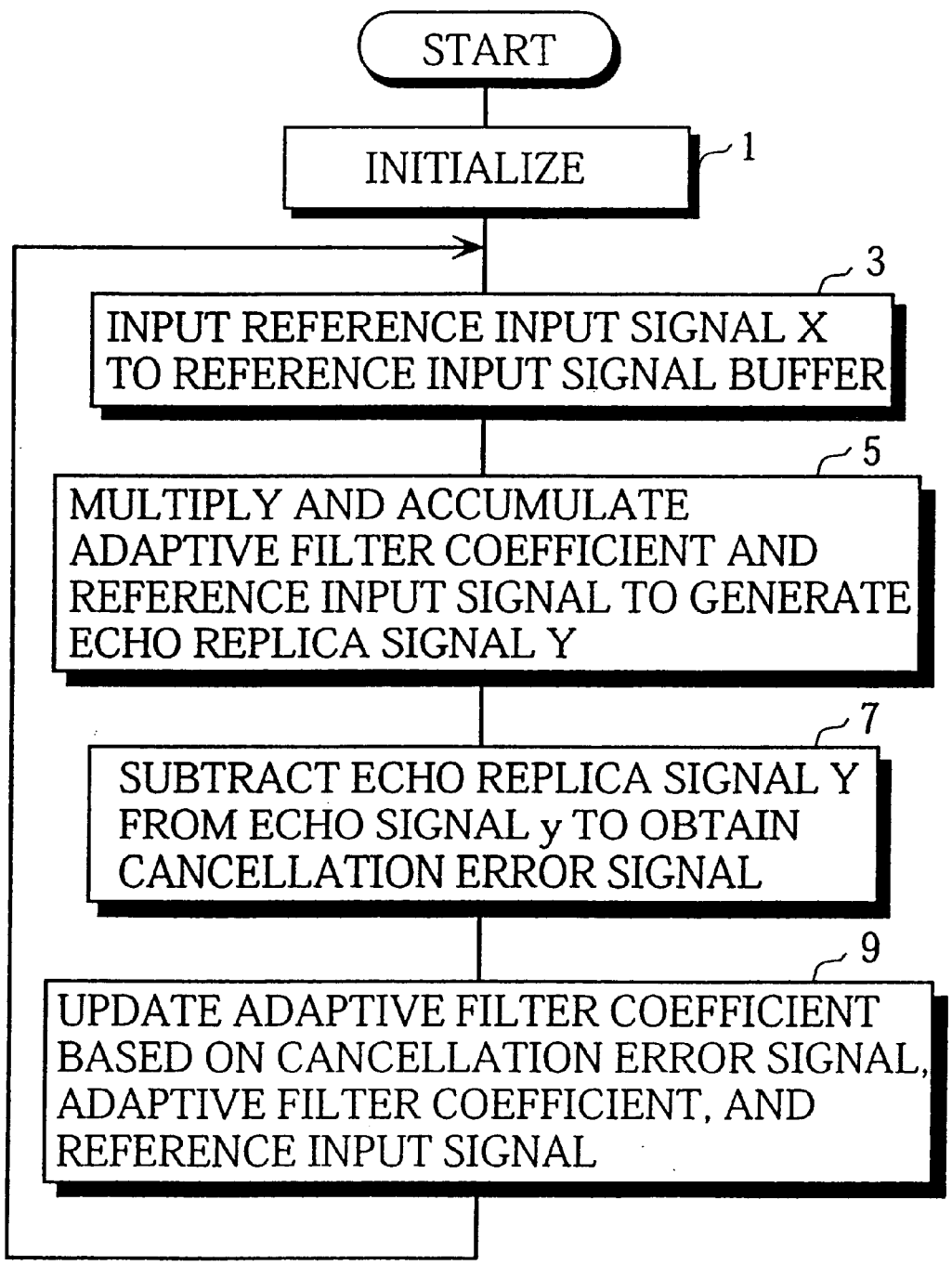
FIG. 2 is a flow chart showing an example of the operation of a conventional technique shown in FIG. 1.
Figure 3:
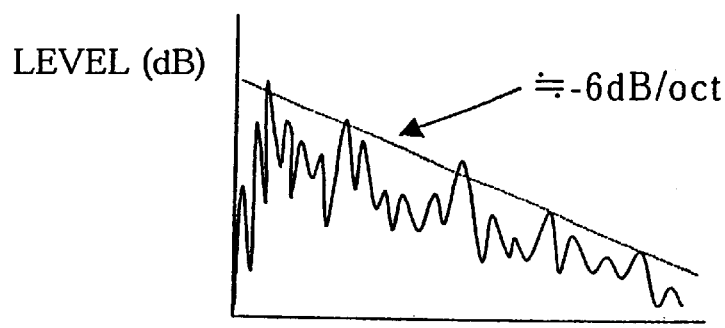
FIGS. 3a and 3b are graphs showing frequency characteristics of a voice signal.
Figure 3:
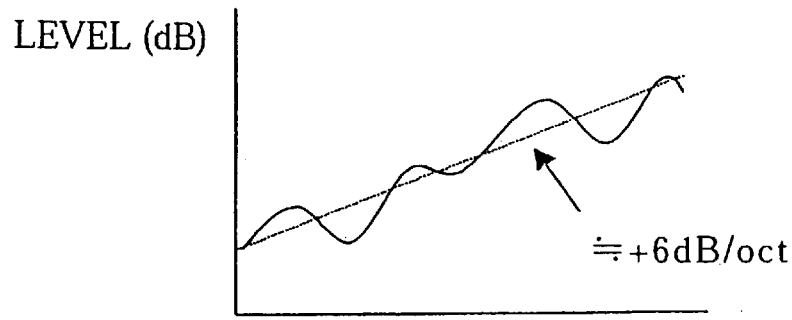
Figure 4:
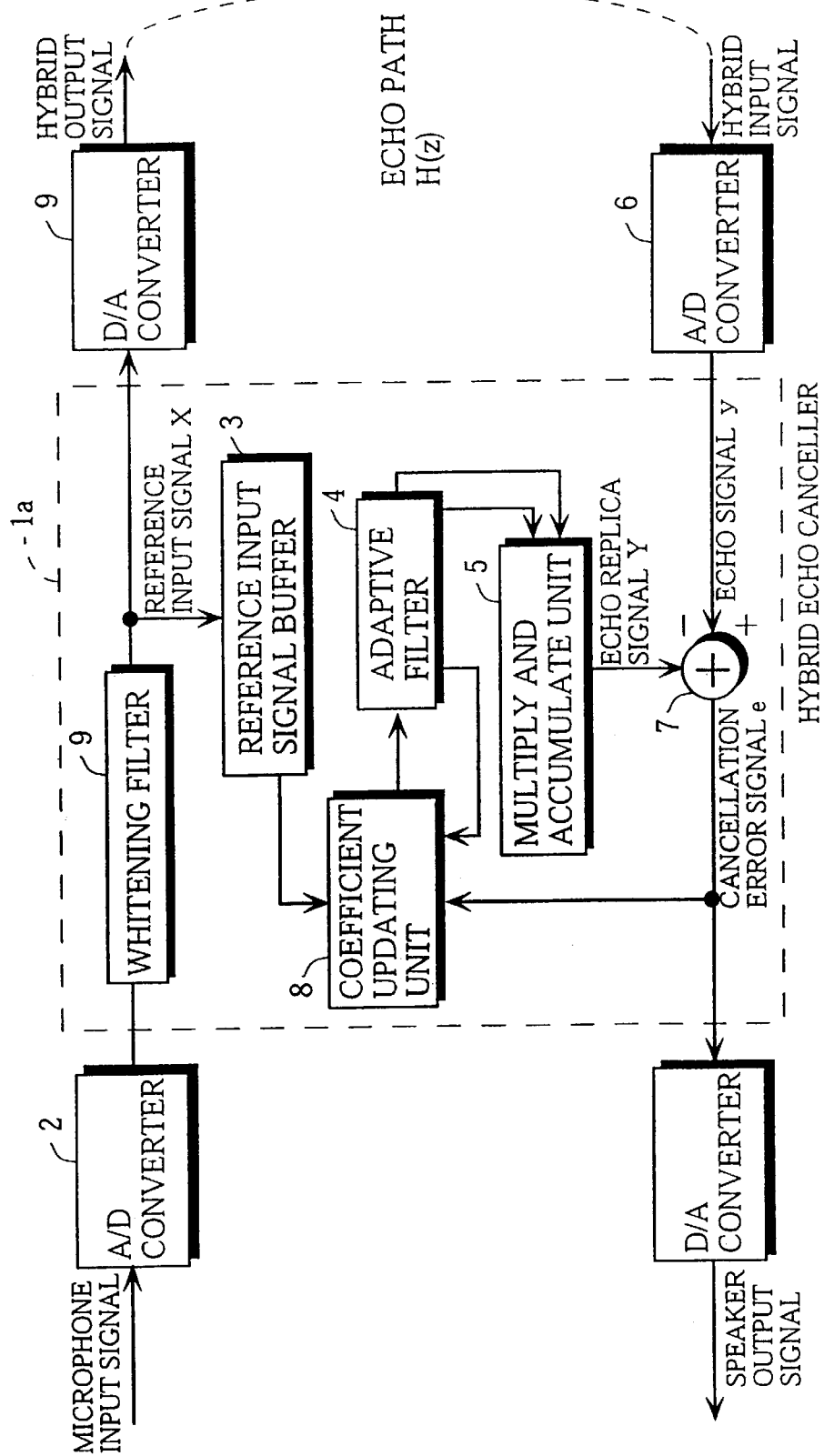
FIG. 4 is a functional block diagram showing an example of another echo canceller.

Furthermore, a learning method in the echo canceller 10 (a whitening filter + the NLMS Method) and the NLMS Method in the conventional echo canceller 1 shown in FIG. 1 are compared with each other by calculating evaluated values using the following equation (4). The evaluated value represents the progress of learning. If the learning progresses, the evaluated value approaches 1.0. In the equation (4), H(i) indicates an impulse response of an echo path, and h(i) indicates a learning coefficient. The evaluated value is calculated by inputting a voice signal shown in FIG. 11b under common conditions that the step gain $\mu$ is 0.05 and the number of taps is 128:

$$\text{Evaluated value} = \frac{\sum H(i)^2 - \sum (H(i) - h(i))^2}{\sum H(i)^2} \quad (4)$$

As can be seen from FIG. 11a, the learning in the echo canceller 10 progresses at higher speed, as compared with that in the conventional echo canceller 1.

As described above, in order to improve the learning speed and the learning precision in the NLMS Method, the deviation in frequency of the voice signal to be the reference input signal X may be decreased. For example, if a whitening filter having the property of increasing a voice signal in level by 5 to 6 dB every time the frequency thereof increases by one octave, as shown in FIG. 12a, is used, it is possible to cancel the attenuation of the level of voiced speech.

When the whitening filter is used with respect to unvoiced speech, however, results as shown in FIG. 12b are obtained. Accordingly, the learning speed may be reduced and the learning precision may be degraded. Therefore, it is considered that different whitening filters are respectively prepared with respect to the voiced speech and the unvoiced speech. When the property of the whitening filter is changed for each input signal, however, an impulse response H(z) of an echo path varies as viewed from the echo canceller 10, so that the performance of the whitening filter is rather degraded.

Actually, the appearance ratio of the voiced speech and the appearance ratio of the unvoiced speech differ in general conversation. Further, when processing of stopping the learning when it is judged that the input voice is absent is performed as control of the echo canceller, the frequency at which the learning is stopped is increased with respect to the unvoiced speech which is relatively low in level. By using a whitening filter which produces a large effect as a whole in consideration of the foregoing, therefore, it is possible to improve the learning speed and the learning precision.

It is preferable that the characteristics of the whitening filter are determined by the statistical frequencies of appearance of voiced speech and unvoiced speech and a method of controlling the learning in the echo canceller. The whitening filter maybe constituted by an FIR (Finite Impulse Response) filter. The CPU 12 may be replaced with a DSP.

The present invention is applicable to not only the hybrid echo canceller but also an acoustic echo canceller. The echo canceller 10 is also applicable to a facsimile modem with a voice recording/reproduction function, for example.

According to the above-mentioned embodiment, the pseudo whitening filter is inserted, thereby making it possible to update the adaptive filter coefficient using the pseudo whitened signal whose deviation in frequency is decreased, and improve the learning speed and the learning precision without substantially changing the echo canceller. Only the reference input signal in the echo canceller is spuriously whitened, to generate the pseudo whitened signal. Accordingly, the sound quality of a signal outputted outward is not degraded.

[2] Description of Second Embodiment

Figure 13:
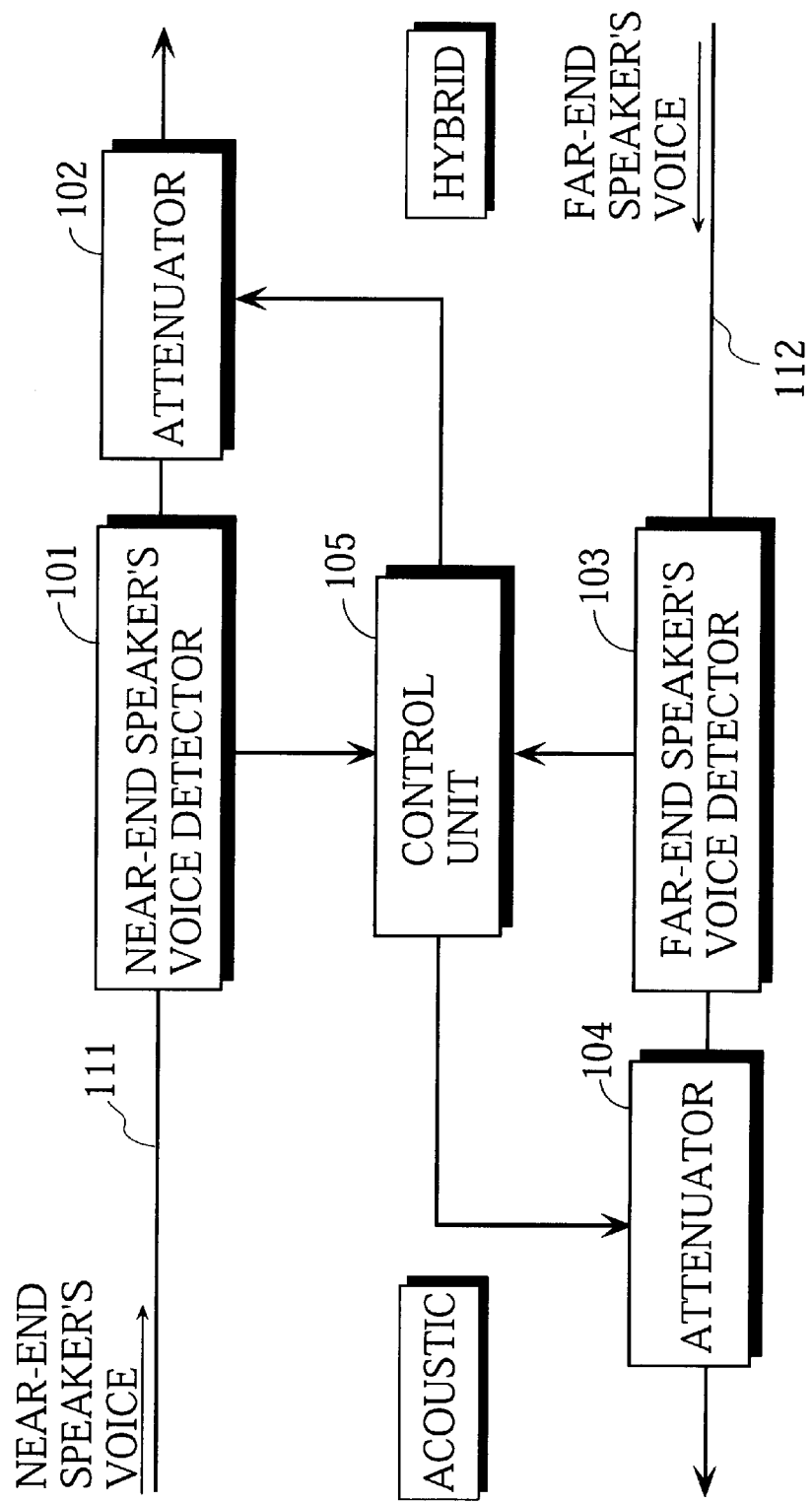
FIG. 13 is a block diagram showing the configuration of a voice switch.
Figure 14:
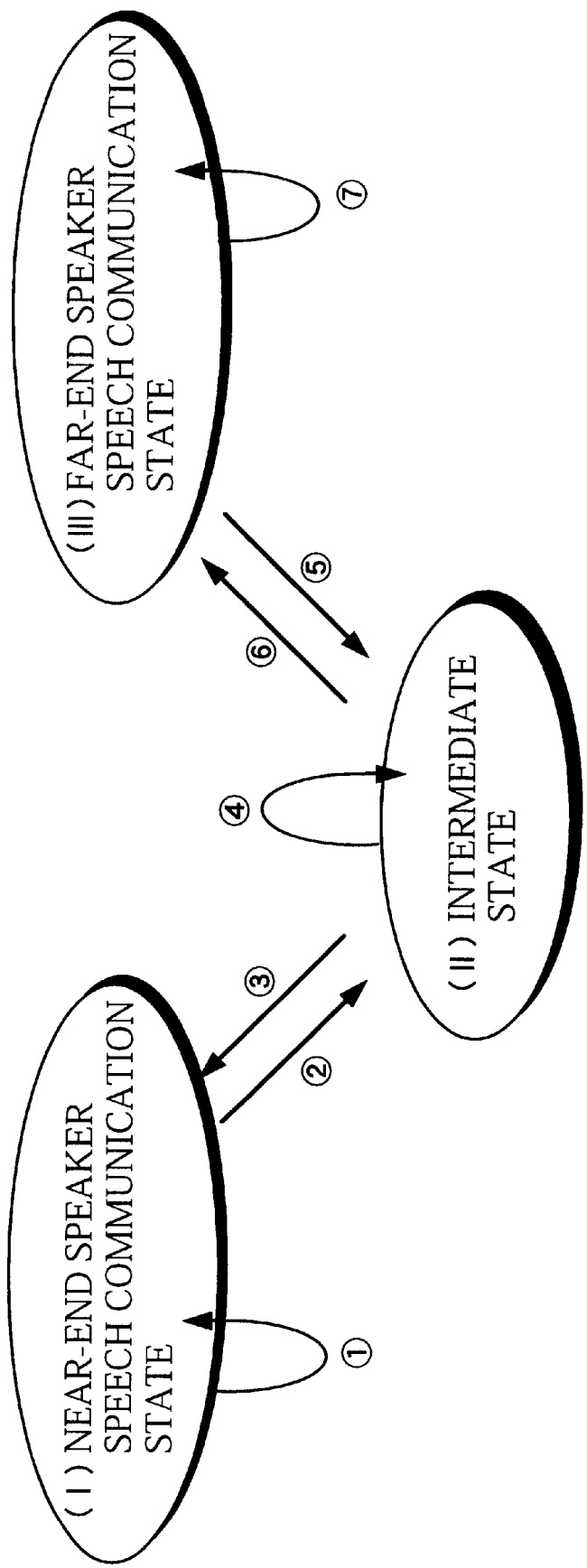
FIG. 14 is a schematic view showing the type of speech communication state and the type of transition of the speech communication state.
Figure 15:
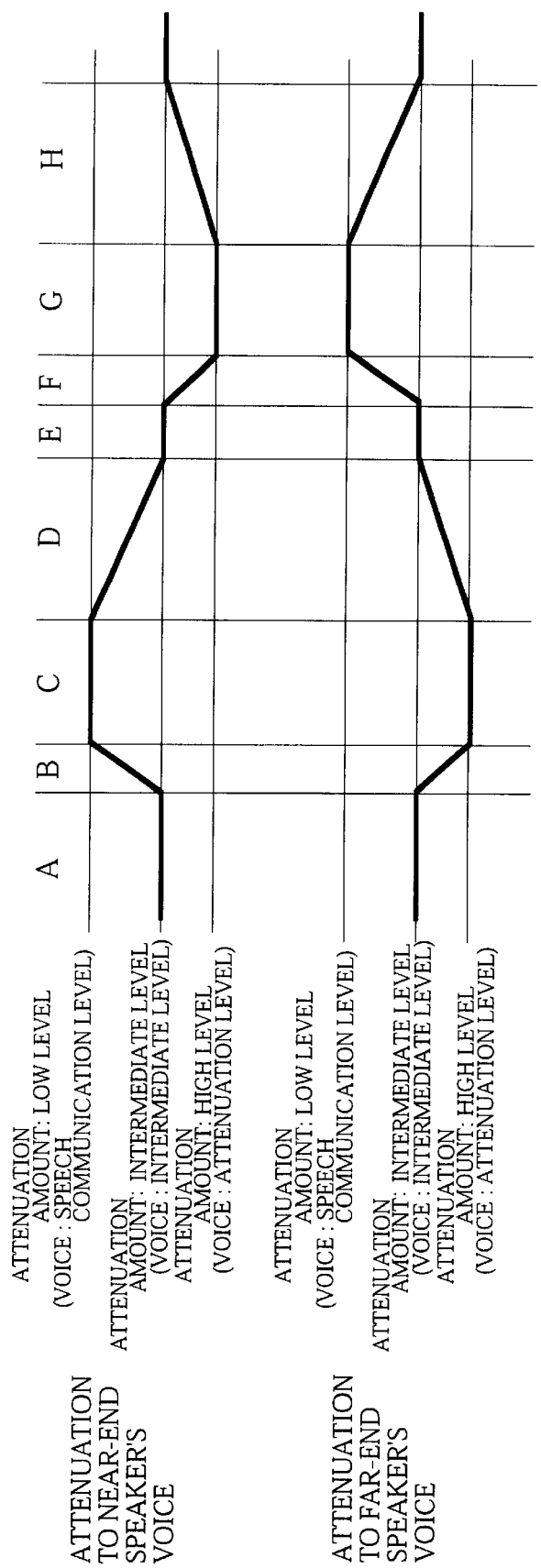
FIG. 15 is a timing chart showing attenuation amounts by attenuators 102 and 104 in each speech communication state and attenuation amounts by attenuators 102 and 104 in a case where the transition of the speech communication state occurs.

Referring now to FIGS. 13 to 15, a second embodiment of the present invention will be described.

FIG. 13 illustrates the configuration of a voice switch.

The voice switch comprises a near-end speaker's voice detector (near-end speaker's voice judgment means) 101 for detecting a near-end speaker's voice which is sent to a transmission path 111, an attenuator 102 provided in the transmission path 111, a far-end speaker's voice detector (far-end speaker's voice judgment means) 103 for detecting a far-end speaker's voice which is sent to a receiving path 112, an attenuator 104 provided in the receiving path 112, and a control unit 105 for respectively controlling the attenuators 102 and 104 on the basis of both the speech detectors 101 and 103.

The near-end speaker's voice detector 101 judges whether the near-end speaker's voice is present or absent, and sends the result of the judgment to the control unit 105. For example, when the power average of a voice signal fed to the transmission path 111 is larger than a power average corresponding to noises stationarily produced, it is judged that the near-end speaker's voice is present. On the other hand, when the power average of the voice signal fed to the transmission path 111 is not more than the power average corresponding to noises stationarily produced, it is judged that the near-end speaker's voice is absent. The far-end speaker's voice detector 103 judges whether the far-end speaker's voice is present or absent, and sends the result of the judgment to the control unit FIG. 14 illustrates the type of speech communication state and the type of transition of the speech communication state.

The type of speech communication state include the following three states.

(I) A state where a near-end speaker is talking by phone (referred to as a near-end speaker speech communication state (I))

(II) An intermediate state (referred to as an intermediate state (II))

(III) A state where a far-end speaker is talking by phone (referred to as a far-end speaker speech communication state (III))

In FIG. 14, ① to ⑦ represent the types of transition.

① indicates the transition from the near-end speaker speech communication state (I) to the near-end speaker speech communication state (I).

② indicates the transition from the near-end speaker speech communication state (I) to the intermediate state (II).

③ indicates the transition from the intermediate state (II) to the near-end speaker speech communication state (I).

④ indicates the transition from the intermediate state (II) to the intermediate state (II).

⑤ indicates the transition from the far-end speaker speech communication state (III) to the intermediate state (II).

⑥ indicates the transition from the intermediate state (II) to the far-end speaker speech communication state (III).

⑦ indicates the transition from the far-end speaker speech communication state (III) to the far-end speaker speech communication state (III).

The control unit 105 determines the current speech communication state (a speech communication state after the transition) on the basis of the results of judgment whether the speaker's voice is present or absent by the near-end speaker's voice detector 101 and the far-end speaker's voice detector 103, the preceding speech communication state determined (a speech communication state before the transition), and the hysteresis of speech communication states preceding the preceding speech communication state. The attenuators 102 and 104 are controlled depending on the state before the transition and the state after the transition.

Description is now made of a method of judging the speech communication state by the control unit 105.

(1) In a case where the preceding speech communication state is the near-end speaker speech communication state (I), when the near-end speaker's voice detector 101 judges that the near-end speaker's voice is present, the current speech communication state is determined as the near-end speaker speech communication state (I) (the transition number ①).

(2) In a case where the preceding speech communication state is the near-end speaker speech communication state (I), when the near-end speaker's voice detector 101 judges that the near-end speaker's voice is absent, and a time period during which a state where the near-end speaker's voice is absent is continued is less than a previously set time period during which the ending of a word is held, the current speech communication state is determined as the near-end speaker speech communication state (I) (the transition number ①).

(3) In a case where the preceding speech communication state is the near-end speaker speech communication state (I), when the near-end speaker's voice detector 101 judges that the near-end speaker's voice is absent, and a time period during which a state where the near-end speaker's voice is absent is continued is not less than a time period during which the ending of a word is held, the current speech communication state is determined as the intermediate state (II) (the transition number ②).

(4) In a case where the preceding speech communication state is the far-end speaker speech communication state (III), when the far-end speaker's voice detector 103 judges that the far-end speaker's voice is present, the current speech communication state is determined as the far-end speaker speech communication state (III) (the transition number ⑦).

(5) In a case where the preceding speech communication state is the far-end speaker speech communication state (III), when the far-end speaker's voice detector 103 judges that the far-end speaker's voice is absent, and a time period during which a state where the far-end speaker's voice is absent is continued is less than a time period during which the ending of a word is held, the current speech communication state is determined as the far-end speaker speech communication state (III) (the transition number ⑦).

(6) In a case where the preceding speech communication state is the far-end speaker speech communication state (III), when the far-end speaker's voice detector 103 judges that the far-end speaker's voice is absent, and a time period during which a state where the far-end speaker's voice is absent is continued is not less than a time period during which the ending of a word is held, the current speech communication state is determined as the intermediate state (II) (the transition number ⑤)

(7) In a case where the preceding speech communication state is the intermediate state (II) when the near-end speaker's voice detector 101 judges that the near-end speaker's voice is present, and a time period during which the intermediate state is continued is not less than a previously set time period during which the intermediate state is held, the current speech communication state is determined as the near-end speaker speech communication state (I) (the transition number ③).

(8) In a case where the preceding speech communication state is the intermediate state (II) when the near-end speaker's voice detector 101 judges that the near-end speaker's voice is present, a time period during which the intermediate state is continued is less than a time period during which the intermediate state is held, and a speech communication state before the current intermediate state is the near-end speaker speech communication state (I), the current speech communication state is determined as the near-end speaker speech communication state (I) (the transition number ③).

(9) In a case where the preceding speech communication state is the intermediate state (II) when the near-end speaker's voice detector 101 judges that the near-end speaker's voice is present, a time period during which the intermediate state is continued is less than a time period during which the intermediate state is held, and a state before the current intermediate state is other than the near-end speaker speech communication state (I), the current speech communication state is determined as the intermediate state (II) (the transition number ④).

(10) In a case where the preceding speech communication state is the intermediate state (II) when the far-end speaker's voice detector 103 judges that the far-end speaker's voice is present, and a time period during which the intermediate state is continued is not less than a time period during which the intermediate state is held, the current speech communication state is determined as the far-end speaker speech communication state (III) (the transition number ⑥).

(11) In a case where the preceding speech communication state is the intermediate state (II) when the far-end speaker's voice detector 103 judges that the far-end speaker's voice is present, a time period during which the intermediate state is continued is less than a time period during which the intermediate state is held, and a state before the current intermediate state is the far-end speaker speech communication state (III), the current speech communication state is determined as the far-end speaker speech communication state (III) (the transition number ⑥).

(12) In a case where the preceding speech communication state is the intermediate state (II) when the far-end speaker's voice detector 103 judges that the far-end speaker's voice is present, a time period during which the intermediate state is continued is less than a time period during which the intermediate state is held, and a state before the current intermediate state is other than the far-end speaker speech communication state (III), the current speech communication state is determined as the intermediate state (II) (the transition number ④).

(13) In a case where the preceding speech communication state is the intermediate state (II) when the near-end speaker's voice detector 101 judges that the near-end speaker's voice is absent, and the far-end speaker's voice detector 103 judges that the far-end speaker's voice is absent, the current speech communication state is determined as the intermediate state (II) (the transition number ④).

FIG. 15 illustrates attenuation amounts by the attenuators 102 and 104 in each of the speech communication states and attenuation amounts by the attenuators 102 and 104 in a case where the transition of the speech communication state occurs When the speech communication state is the near-end speaker speech communication state (I), the attenuation amount by the attenuator 102 is set to a low level (the near-end speaker's voice level is set to a speech communication level), and the attenuation amount by the attenuator 104 is set to a high level (the far-end speaker's voice level is set to an attenuation level), as indicated by a section C in FIG. 15.

When the speech communication state is the far-end speaker speech communication state (III), the attenuation amount by the attenuator 102 is set to a high level (the near-end speaker's voice level is set to an attenuation level), and the attenuation amount by the attenuator 104 is set to a low level (the far-end speaker's voice level is set to a speech communication level), as indicated by a section G in FIG. 15.

When the speech communication state is the intermediate state (II), the attenuation amount by the attenuator 102 is set to an intermediate level (the near-end speaker's voice level is set to an intermediate level), and the attenuation amount by the attenuator 104 is set to an intermediate level (the far-end speaker's voice level is set to an intermediate level), as indicated by a section A or E in FIG. 15.

In the case of the transition from the intermediate state (II) to the near-end speaker speech communication state (I) in FIG. 14 (the transition number ③), the attenuation amount by the attenuator 102 is controlled such that the near-end speaker's voice level is rapidly changed from the intermediate level to the speech communication level, and the attenuation amount by the attenuator 104 is controlled such that the far-end speaker's voice level is rapidly changed from the intermediate level to the attenuation level, as indicated by a section B in FIG. 15.

In the case of the transition from the near-end speaker speech communication state (I) to the intermediate state (II) in FIG. 14 (the transition number ②), the attenuation amount by the attenuator 102 is controlled such that the near-end speaker's voice level is gently changed from the speech communication level to the intermediate level, and the attenuation amount by the attenuator 104 is controlled such that the far-end speaker's voice level is gently changed from the attenuation level to the intermediate level, as indicated by a section D in FIG. 15.

In the case of the transition from the intermediate state (II) to the far-end speaker speech communication state (III) in FIG. 14 (the transition number ⑥), the attenuation amount by the attenuator 102 is controlled such that the near-end speaker's voice level is rapidly changed from the intermediate level to the attenuation level, and the attenuation amount by the attenuator 104 is controlled such that the far-end speaker's voice level is rapidly changed from the intermediate level to the speech communication level, as indicated by a section F in FIG. 15.

In the case of the transition from the far-end speaker speech communication state (III) to the intermediate state (II) in FIG. 14 (the transition number ⑤), the attenuation amount by the attenuator 102 is controlled such that the near-end speaker's voice level is gently changed from the attenuation level to the intermediate level, and the attenuation amount by the attenuator 104 is controlled such that the far-end speaker's voice level is gently changed from the speech communication level to the intermediate level, as indicated by a section H in FIG. 15.

In the above-mentioned control of the attenuation amounts, the attenuation amounts are increased or decreased such that the product of the attenuation amount by the attenuator 102, the attenuation amount by the attenuator 104, and a loop gain is less than 1.0.

According to the above-mentioned embodiment, the current speech communication state is determined on the basis of not the level of the input signal but the judgment whether the input voice is present or absent. Accordingly, the communication state is not easily affected by variations in level by movement of a near-end speaker, a line fault, and so forth.

The transition between the near-end speaker speech communication state and the far-end speaker speech communication state always occurs via the intermediate state, so that a switching feeling is reduced.

In a time period from the transition to the intermediate state to the time when a time period during which the intermediate state is held has elapsed, the intermediate state is maintained in principle, thereby making it possible to minimize the cutting of the beginning or the ending of a word.

Even in a case where the transition to the intermediate state occurs, and a time period during which the intermediate state is continued is shorter than a time period during which the intermediate state is held, when it is judged that the speaker's voice in the same direction of speech communication as that in a speaker speech communication state before the transition to the intermediate state is present, the intermediate state is rapidly returned to the speaker speech communication state before the transition to the intermediate state. Accordingly, an operation in a section where speaker's voice is absent, such as a breathing portion, is stabilized.

Furthermore, in the case of the near-end speaker speech communication state, even if it is judged that the near-end speaker's voice is absent, the near-end speaker speech communication state is maintained when a state where the near-end speaker's voice is absent is shorter than a time period during which the ending of a word is held. Accordingly, the ending of the word is not easily cut. Similarly, in the case of the far-end speaker speech communication state, even if it is judged that the far-end speaker's voice is absent, the near-end speaker speech communication state is maintained when a state where the far-end speaker's voice is absent is shorter than a time period during which the ending of a word is held. Accordingly, the ending of the word is not easily cut.

What is claimed is:

1. An echo canceling method for updating an adaptive filter coefficient utilizing a digitized input signal to cancel an echo, comprising the steps of:

dividing said digitized input signal to obtain a reference input signal and a hybrid output signal from said input signal;

spuriously whitening said reference input signal, to obtain a pseudo whitened signal;

generating an echo replica signal on the basis of said pseudo whitened signal and said adaptive filter coefficient;

obtaining a cancellation error signal on the basis of an echo signal corresponding to said hybrid output signal, and said echo replica signal; and updating said adaptive filter coefficient on the basis of said cancellation error signal, said adaptive filter coefficient and said pseudo whitened signal.

2. An echo canceller for updating an adaptive filter coefficient utilizing a digitized input signal to cancel an echo, comprising:

whitening means for spuriously whitening a reference input signal obtained from part of said input signal, to obtain a pseudo whitened signal, another part of said input signal being provided as a hybrid output signal;

echo replica signal generation means for generating an echo replica signal on the basis of said pseudo whitened signal and said adaptive filter coefficient;

cancellation error signal calculation means for obtaining a cancellation error signal on the basis of the echo signal corresponding to said hybrid output signal, and said echo replica signal; and coefficient updating means for updating said adaptive filter coefficient on the basis of said cancellation error signal, said adaptive filter coefficient and said pseudo whitened signal.

3. The echo canceller according to claim 2, wherein said whitening means is composed of an IIR filter.

4. The echo canceller according to claim 2, wherein said whitening means is composed of an FIR filter.

* * * * *